July 11, 1972 G. L. MAYER, JR., ET AL 3,676,000
DATA ENCODING AND DECODING APPARATUS AND METHOD
Filed Dec. 31, 1970 10 Sheets-Sheet 1
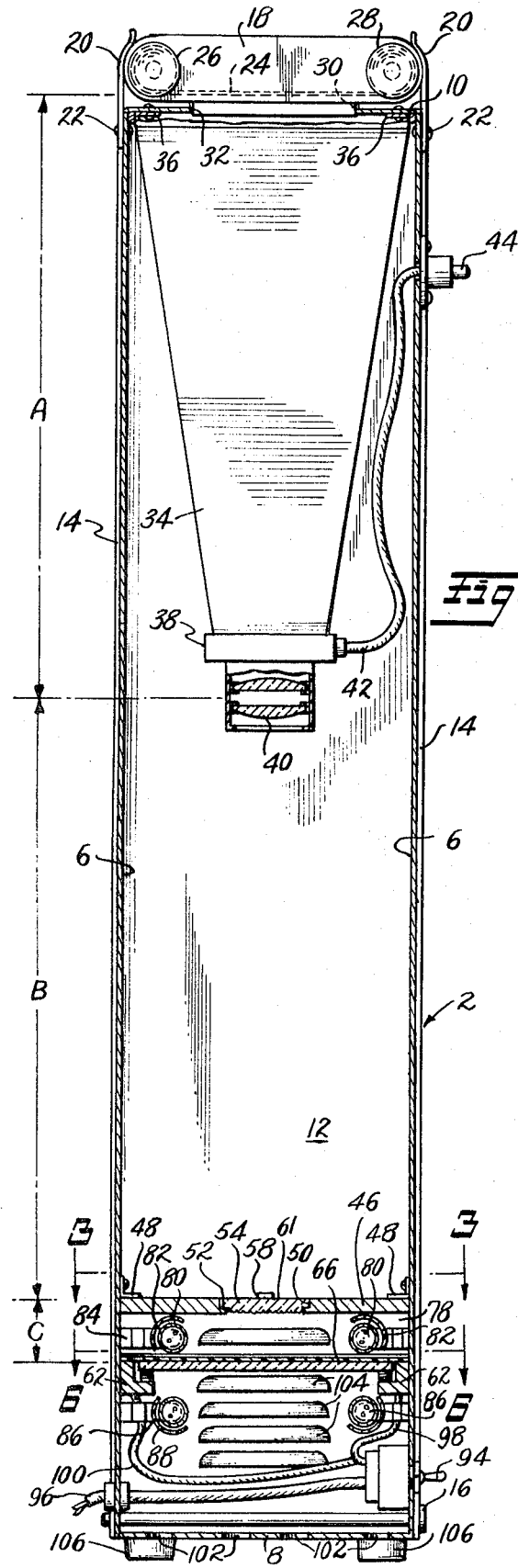
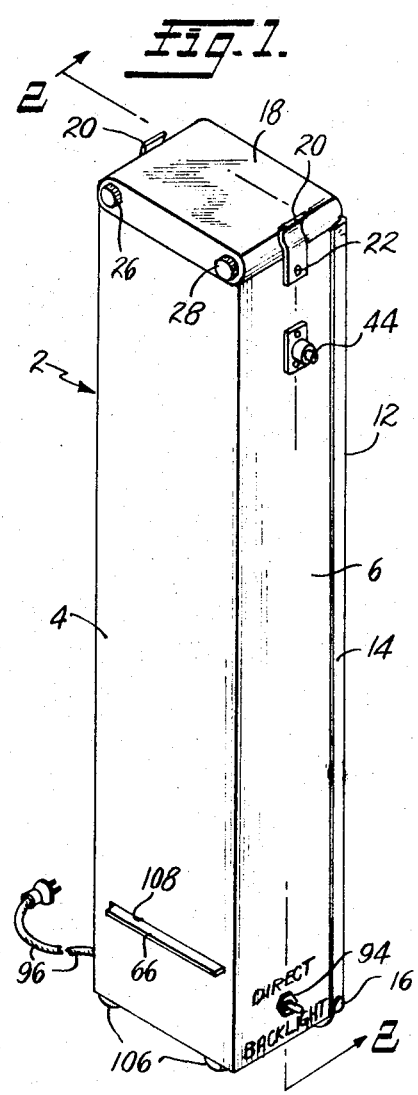
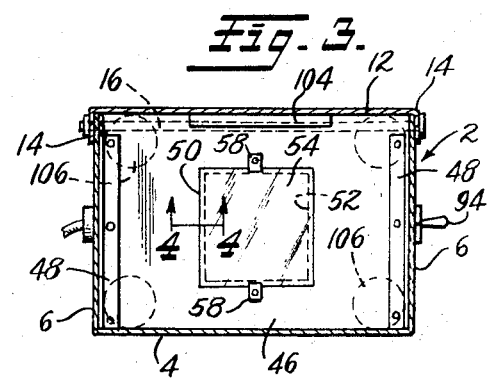
INVENTORS
GEORGE L. MAYER, JR.
DAVID L. DOBBINS
BY Bacon & Thomas

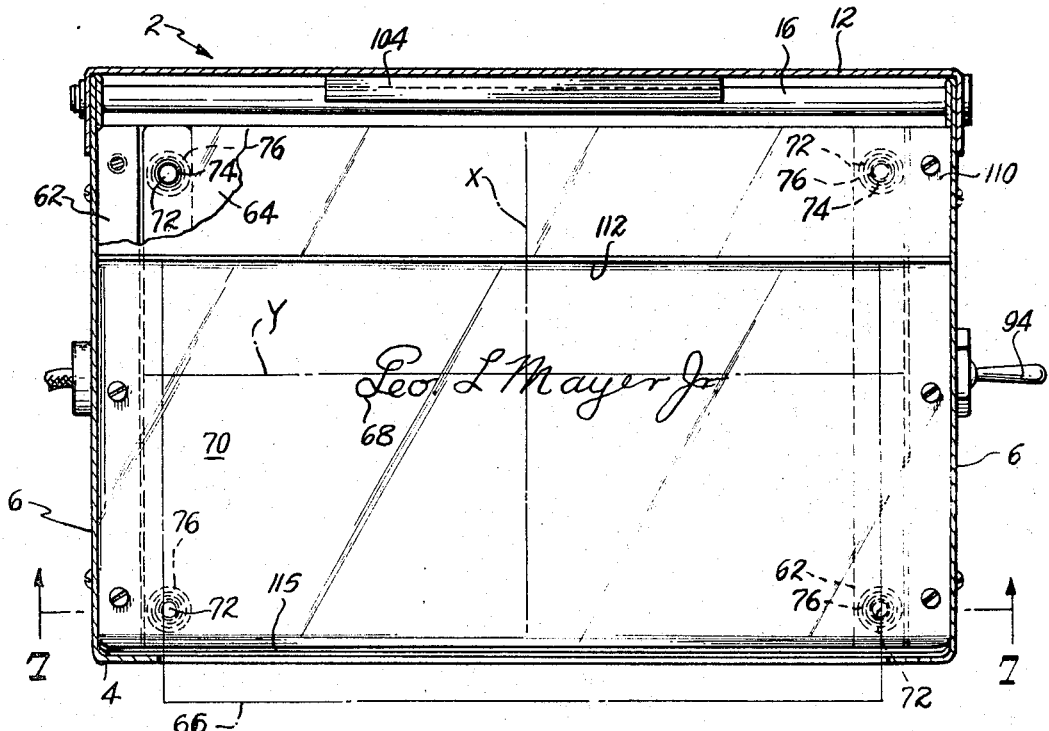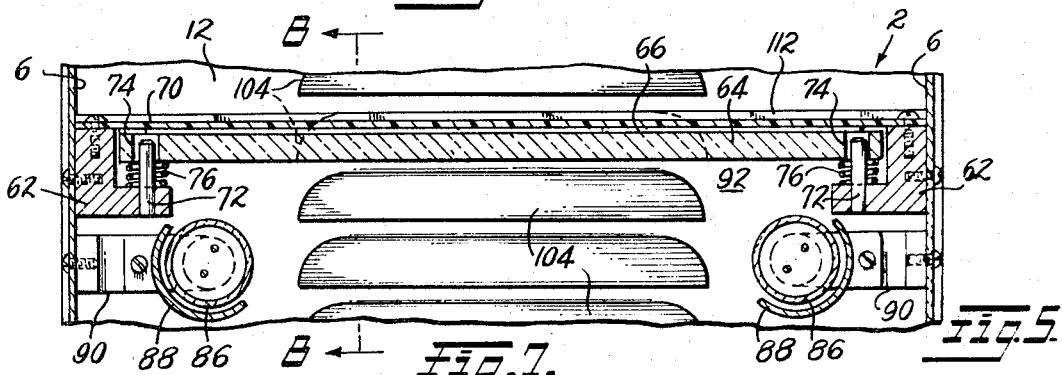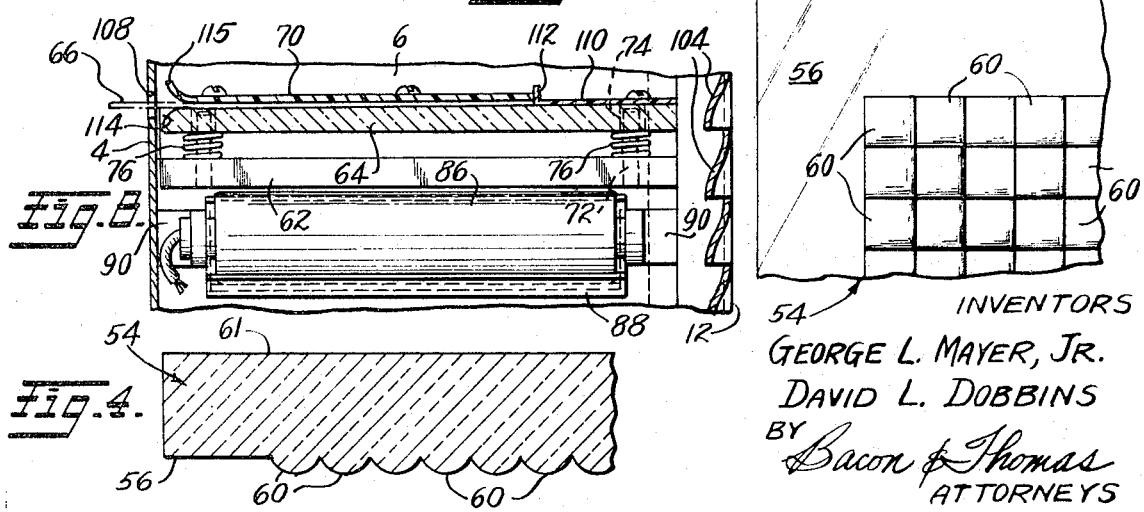

July 11, 1972  G. L. MAYER, JR., ET AL  3,676,000
DATA ENCODING AND DECODING APPARATUS AND METHOD
Filed Dec. 31, 1970  10 Sheets-Sheet 3
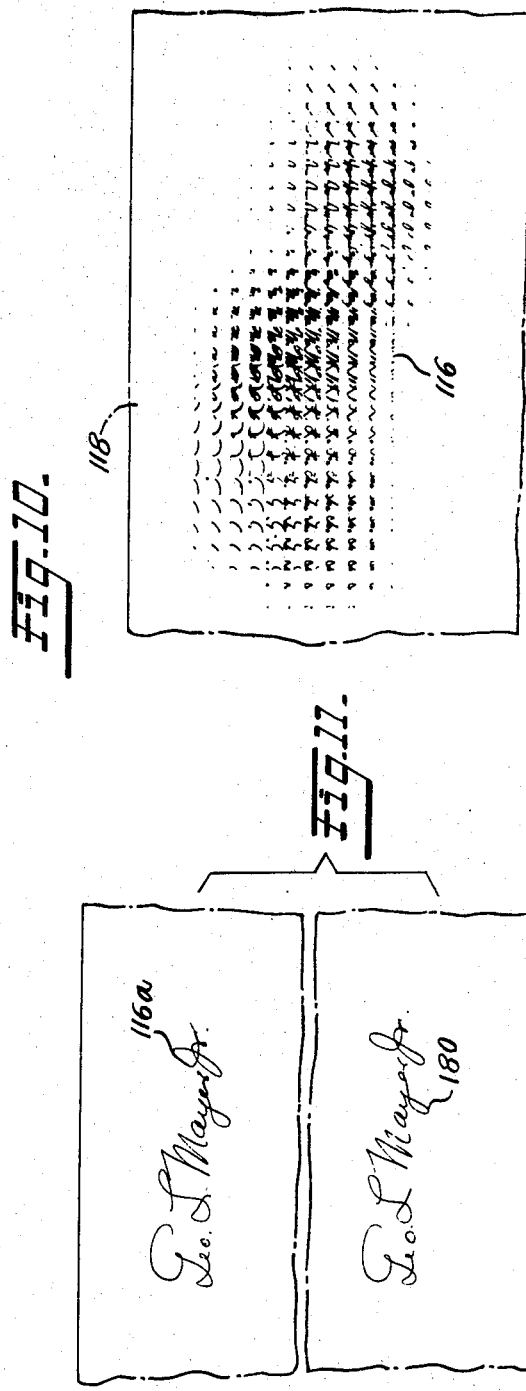
Fig. 9.
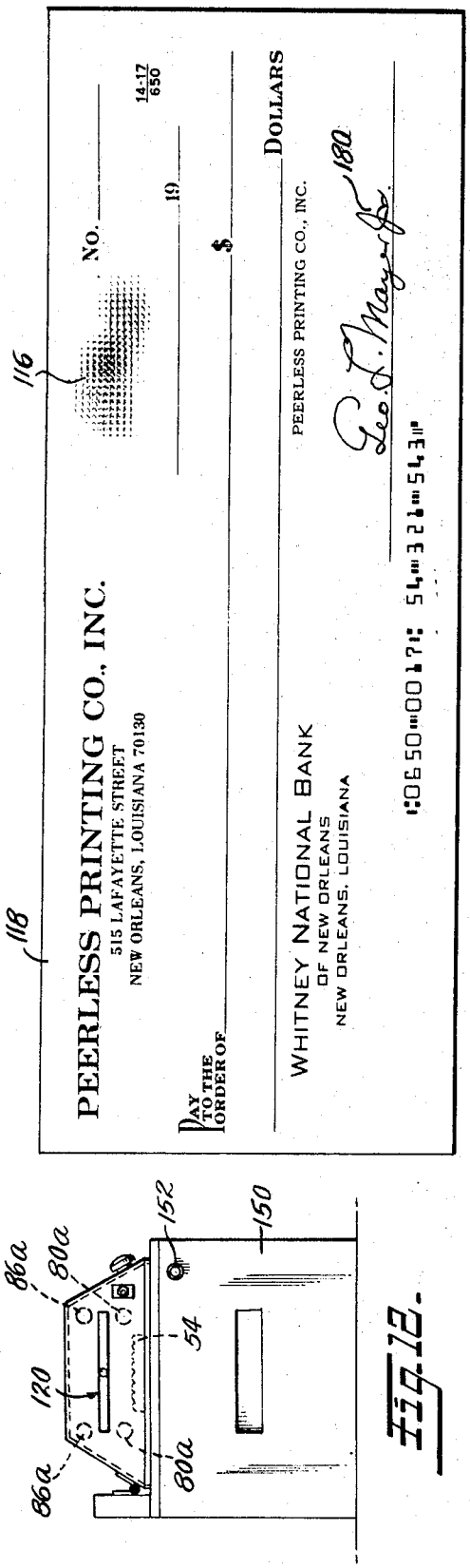
Fig. 10.
Fig. 11.
Fig. 12.
INVENTORS
GEORGE L. MAYER, JR.
DAVID L. DOBBINS
BY
Bacon & Thomas
ATTORNEYS

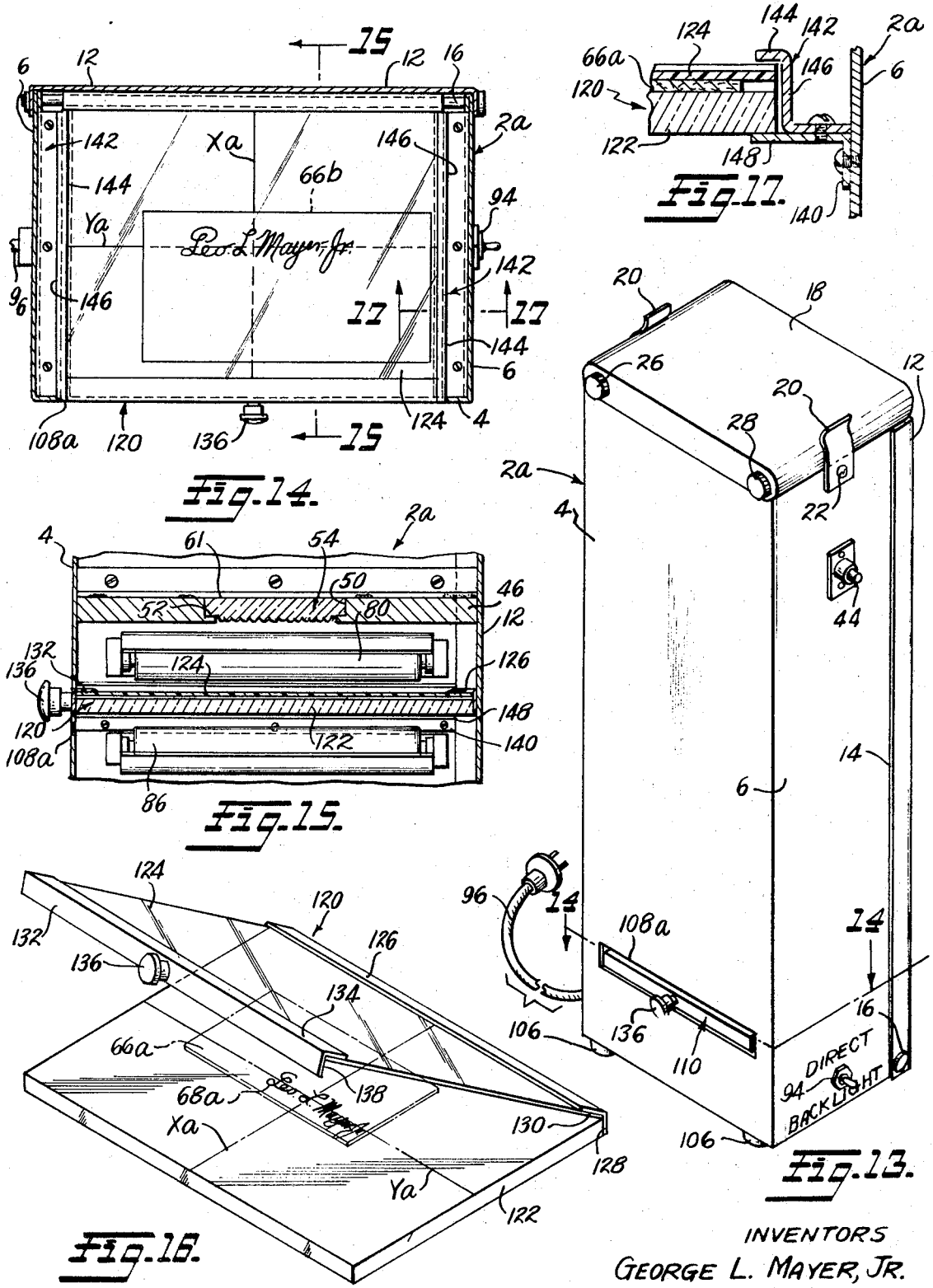

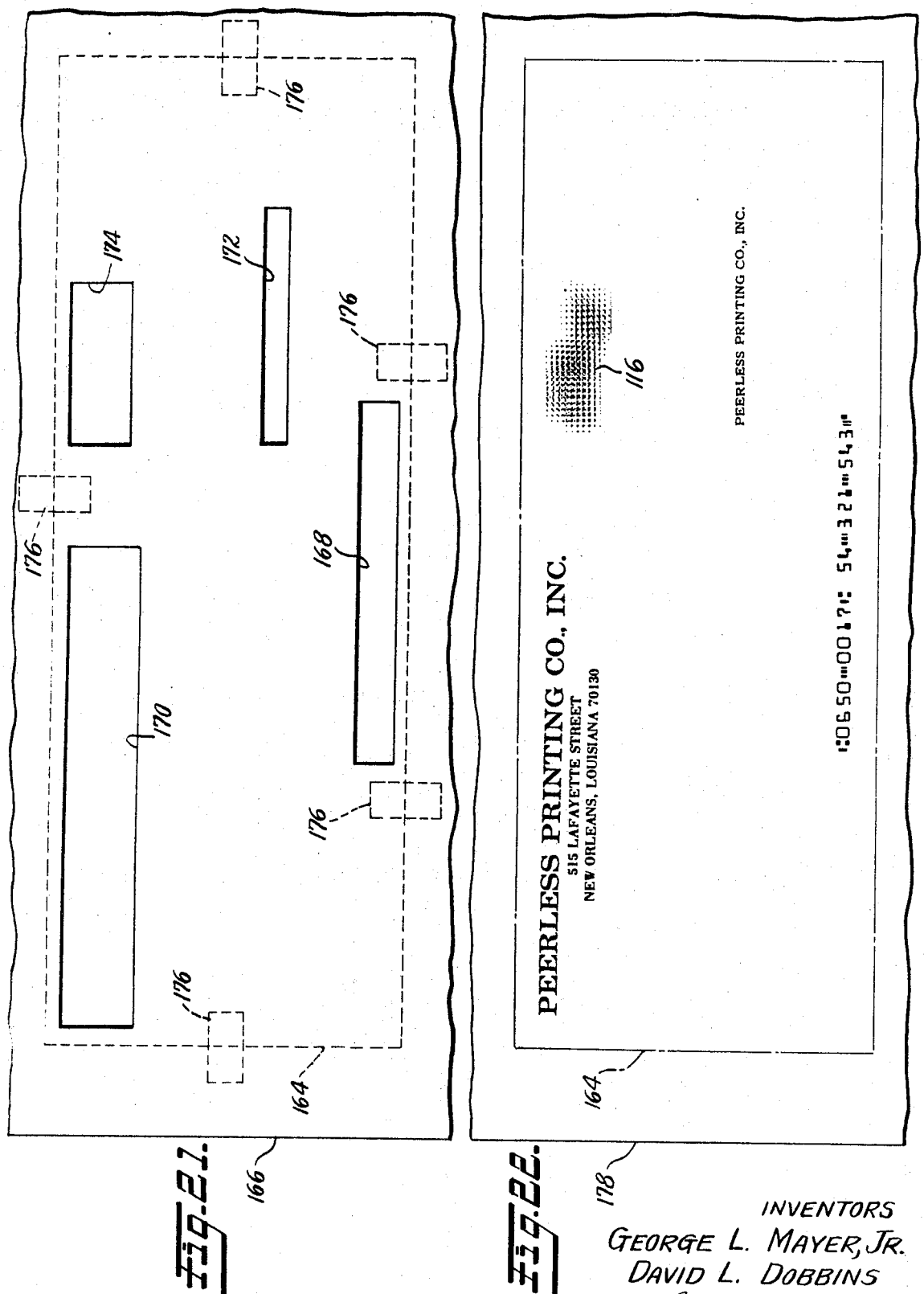

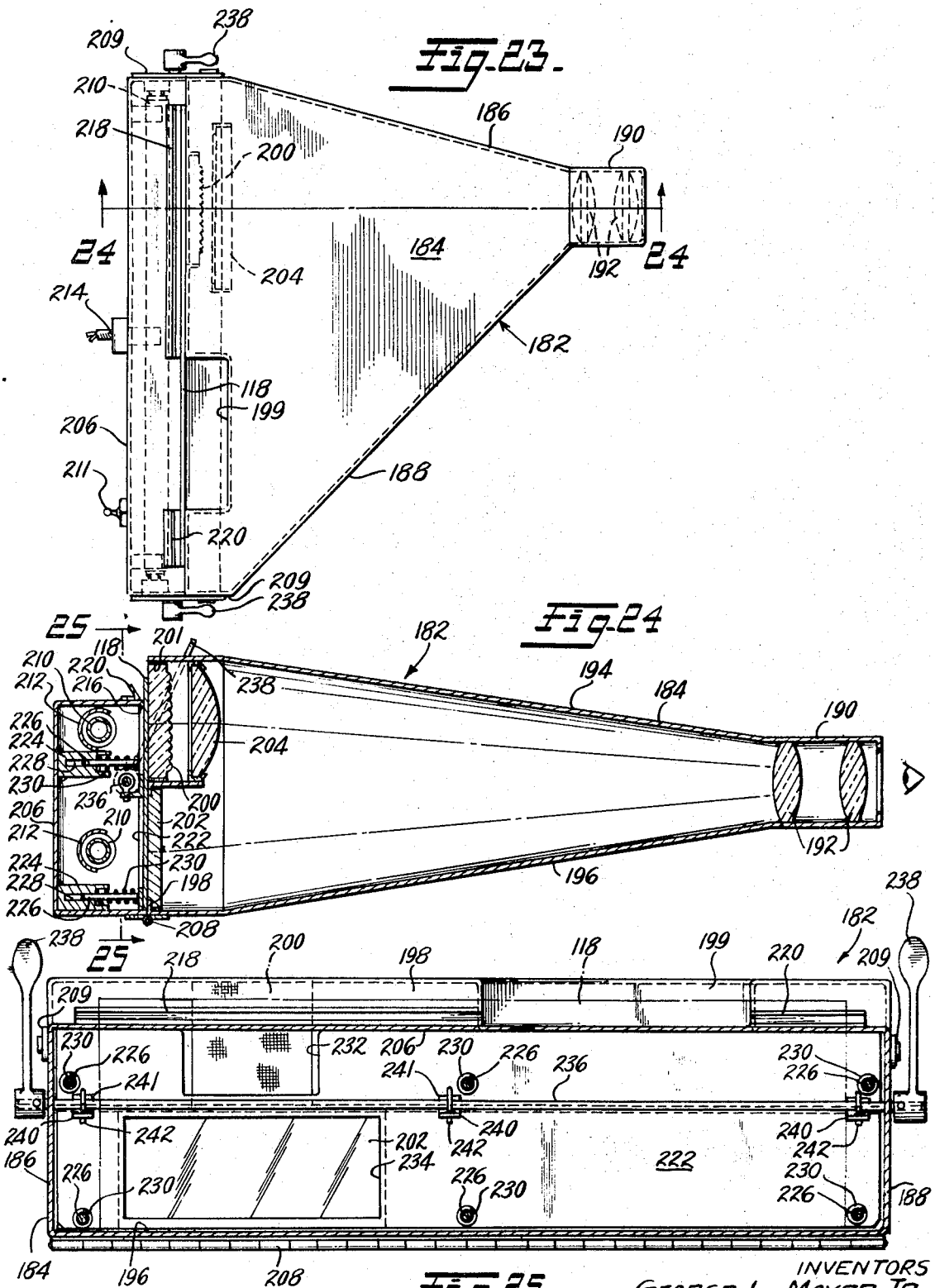

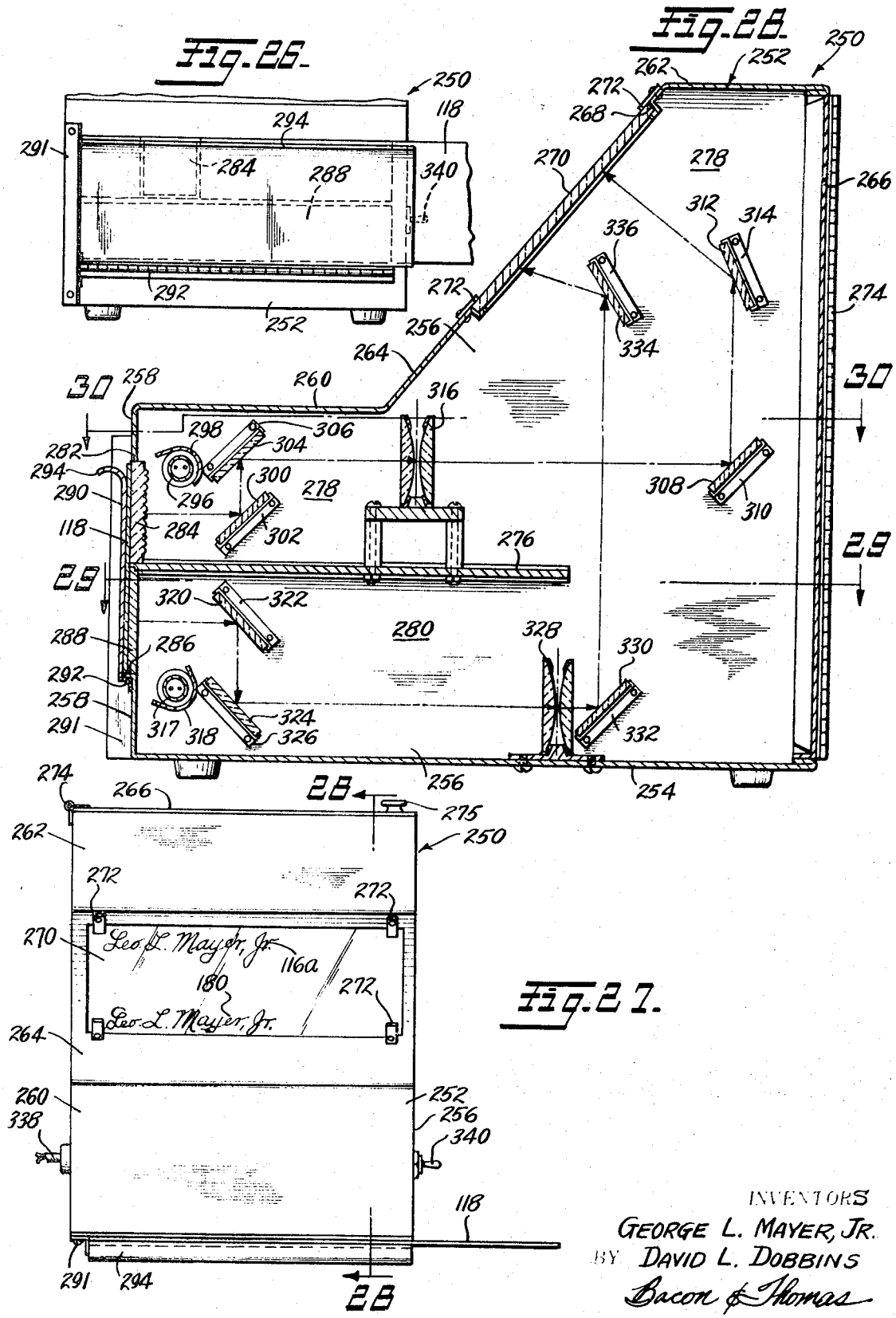

United States Patent Office 3,676,000
Patented July 11, 1972

3,676,000
DATA ENCODING AND DECODING APPARATUS AND METHOD
George L. Mayer, Jr., New Orleans, La., and David L. Dobbins, McLean, Va., assignors to Coded Signatures, Inc., New Orleans, La.
Filed Dec. 31, 1970, Ser. No. 103,204
Int. Cl. G03b 27/68
U.S. Cl. 355—52
22 Claims

ABSTRACT OF THE DISCLOSURE

Apparatus and method or system for encoding and recording coded data, and retrieving the same by decoding and display thereof for direct viewing or for viewing on a screen. The method comprises utilizing a multiple array lens, otherwise known as a "fly's eye" lens, for "scrambling" the data to be encoded and also for "unscrambling" or decoding the data. The encoding means includes photographic means for making a negative film, or a direct positive photo, of the image appearing at the back face of the encoding lens. In the case of a photographic negative, a positive print is made therefrom. The positive print, whether made directly or indirectly, is applied to a paste-up sheet, which is photographed and the negative thereof is used with a masking sheet to expose an offset printing plate. Alternatively, a positive printing plate can be made directly from the paste-up sheet and used for ink-printing the encoded data. The system includes decoding apparatus for converting the encoded data back to its original form for viewing and, if desired, display and comparison with other matter, which may appear on the same document containing the encoded data.

FIELD OF THE INVENTION

The present invention relates to apparatus for encoding and recording, and decoding data for direct viewing or comparison with other matter. By way of specific example, and not limitation, the present disclosure illustrates apparatus for the encoding and recording, and decoding and direct viewing or comparison of an encoded signature with the same signature in hand-written form. By way of further example, and not limitation, the disclosure is directed to the encoding of a signature appearing on a signature card of a bank, or the like, printing the encoded signature on a check; and comparison of the decoded signature with a hand-written signature on the same check. This enables a bank teller to instantly compare the encoded signature with the written signature on the check to determine whether the written signature is a forgery, and eliminates the time now wasted in comparing a signature on a check with that on a signature card.

DESCRIPTION OF THE PRIOR ART

Various attempts have been made heretofore to "scramble" or encode and record signatures and other information, and to subsequently retrieve such information by "unscrambling" the same for visual viewing. Encoded and various mutilated signatures have heretofore been applied to bank pass books, travelers checks, etc. The systems employing encoding are subject to the general objection that overlapping images are formed, which are difficult to resolve in decoding so that a clear-cut reproduction of the original encoded material is not always obtainable. The mutilated signature method requires matching a half portion of a signature produced on one end of the check with a half portion of the endorser's signature. This involves folding back a portion of the check along a line passing through the endorser's signature to match it with the portion appearing at said one end of said check. Another system requires the use of masking screens and the photographing of dummy material along with the information to be encoded, so that a great deal of time is required for encoding, and, moreover, a special viewing screen is required to blank out the dummy material in decoding. Systems including photography with the use of optical fibers have also been suggested, but these do not produce 100% encoding of the data to be encoded and otherwise present serious problems in decoding, as when the encoding optical fibers become twisted and the encoded data requires unscrambling by the same, or an identically twisted set of fibers, the latter presenting obvious practical problems. Still other devices have employed complex optical systems for producing cryptograms of signatures, but the encoding apparatus, is very complicated and expensive as is also the complementary decoding apparatus.

SUMMARY OF THE INVENTION

The foregoing objections and disadvantages are overcome by the present encoding and decoding apparatus and method, which require relatively simple and inexpensive components and contemplate:

(a) Encoding and recording the image of encoded data, for example, a signature, on a negative film (which is developed and used to make a positive print), or directly making a positive print of the image of the encoded signature;

(b) Pasting the desired portion of the positive print on a paste-up sheet optionally together with other information that it is desired to have printed simultaneously with the printing of the encoded data;

(c) Photographing the paste-up sheet to obtain a photographic negative thereof;

(d) Providing a masking sheet with openings therein coinciding with only those portions of the negative containing the matter that was added to the paste-up sheet, and applying the masking sheet to the negative with the openings thereof in registration with the matter on the negative to be printed, thereby blocking out all other matter on the negative that initially appeared on the paste-up sheet.

(e) "Burning" the masking sheet and negative against a sensitized plate to produce an offset printing plate containing only the matter that was added to the paste-up sheet;

(f) Utilizing the offset printing plate to print the additional matter on a blank check corresponding to the paste-up sheet and (g) Decoding the encoded data for viewing, and for comparison with other matter when desired.

As an alternative, the procedure described in paragraphs (c), (d) and (e) can be omitted and a positive printing plate made, which contains only the matter added to the check blank corresponding to the paste-up sheet.

In the case of the bank check, which has been selected as an illustrative example, after it has been filled in and signed, the hand written signature can be compared with the decoded signature by placing the check in a decoding apparatus of a type which provides for direct viewing through a telescopic eye piece, or a display of the decoded signature and the hand written signature on a viewing screen for comparison at the time the check is presented for deposit or cashing. Forgery is readily revealed, if there is a disparity between the decoded signature and the hand written signature. Aid against forgery is achieved when the maker is required to sign it or another paper for comparison in presence of person to whom it is being presented for honoring. The same would apply to deposit slips containing the encoded signature for comparison with deposit endorsement when part is deposited and part withdrawn in cash.

The present system is a great convenience and time-saver for banks, savings and loan associations, etc., because it eliminates the time wasted in pulling signature cards from the files for vertification of the signature on the check.

The decoding apparatus is also an invaluable safeguard for business establishments that cash checks for payment of goods, services, lodging, etc., because it provides a quick reliable means for authenticating the written signature on the check at the time that it is presented as payment. The system is also of great benefit to anyone using a check or credit card containing his encoded signature because of the protection it affords against the danger of possible fraud and forgery should the check blanks or credit card be lost or stolen. An encoded signature on the credit card can aid an honoree of the card by affording a means of comparison of the decoded signature with that on a voucher signed by a card holder. In addition, banks, savings and loan institutions, credit card companies, and the like; can be supplied with encoding equipment so that the encoding of the signatures can be done at the institutions and the printer supplied only with a photographic negative or a positive print, of the image of the encoded signature for use in printing the same on any given document, thereby rendering it unnecessary for the signature cards to be removed from the institution.

More specifically, the invention relates to a novel method, and to novel encoding and decoding apparatus for general use, but which is peculiarly adapted for encoding and recording signatures, and for decoding and visually displaying the decoded signature. The decoder may include means for displaying matter to be compared with the decoded data, unless decoding alone is all that is desired, as may be the case with secret documents.

One type of encoding device comprises a transparent support for a document containing the information to be encoded enclosed in a cabinet with lights for selective direct lighting or back-lighting the document. A multiple array encoding lens, otherwise known as a "fly's eye" lens, is positioned above the data to be encoded and may be spaced therefrom a distance to provide a reduction in size of the image of the encoded material, if desired, say to about one-half of the original size. Such reduction is desirable, particularly where the encoded signature is to be printed upon a bank check where space for printing is limited. A camera is positioned above the encoding lens and includes a relay lens located a predetermined distance from the encoding lens, and a negative film positioned a predetermined distance from the relay lens, so as to provide a one-to-one photograph of the image at the back of the encoding lens. In other words, the camera negative photographs an image of the same size as the image at the back of the encoding lens.

The film used is preferably black and white and of a high contrast type, so that only black and white appear on the photograph (preferably no intermediate gray shades). Due to space requirements on documents such as checks, the recorded material should appear well within an area of about 1" by 2" on the film. The film is developed in the usual manner and is printed to provide a positive photograph of the encoded material. It will be understood that the encoding lens "scrambles" the encoded material so that it is unreadable by the human eye.

Encoding of a signature and recording of the encoded image can also be effected by using an encoding lens with apparatus that will directly make a positive photo print of the image appearing at the back of the encoding lens. The print, obtained by either of the methods indicated above, is cut to suitable size and mounted upon a paste-up sheet which may contain additional information to be included in the final printed item. In case of a bank check, the paste-up sheet could be a partially printed check or check blank and have added to it additional encoded data, such as information indicating the credit rating and/or the average bank balance of the customer. The paste-up sheet would also normally additionally include the name and address of the customer, and the numerical data required to be printed upon the check to enable computer handling of the check. All such information is first typed or printed on strips of paper that are later adhesively attached to the paste-up sheet.

After the paste-up sheet has been completed, a photographic negative is made of the entire sheet. This negative is attached to the back of an opaque masking sheet in which openings have been cut to coincide only with the matter on the pasted strips, thereby blocking out everything else, if present, on the paste-up sheet. The masking sheet and the negative are then placed on a photo-sensitized offset printing plate with the negative in contact with the plate, and then exposed to suitable light, or to use the nomenclature of the trade, "burned" to provide an offset printing plate, which is later developed. The finished plate is used to print the encoded and other information on partially printed check blanks similar to that used as the initial paste-up sheet to complete the same for use by the customer. The encoded signature is most conveniently printed in the upper right hand portion of the check in an area directly above the space where the check will be signed by the customer. Since the encoded image is inverted by the encoding lens, the printed image appears upside down on the check.

As indicated above, an alternative and simpler method can be used and consists in making a positive printing plate from the paste-up sheet and using it to print the encoded and other information on the check blanks.

The apparatus for retrieving the encoded data by decoding and displaying the same consists essentially of means for "unscrambling" the encoded material and presenting the same in legible form for visual viewing. The decoding apparatus includes a decoding lens identical to the encoding lens, but mounted so that the encoded material must be placed in contact with its back face so that the image is inverted and reproduced on the array-side of the decoding lens in a right side up manner.

One type of decoding device provides direct viewing of the decoded signature and the hand written signature through a telescopic eye-piece. This device comprises a cabinet having a front wall in which the decoding lens is mounted above a plain glass or plastic window. The check is positioned right side up in confronting relation with the smooth side of the decoding lens and the plain window, and is held against both by a pressure plate. The pressure plate is of skeleton form providing openings through which the light from a pair of lamps can be projected to back-light the encoded and hand written signatures. If the encoded signature was reduced to about ½ size in encoding the same, then a magnifying lens is positioned close to the decoding lens to magnify the decoded image appearing on the array-side thereof to about twice its size, so that the reproduction of the encoded signature assumes substantially the same size that it had at the time of encoding. Since the hand written signature is positioned in front of a plain window, it can be simultaneously viewed for visual comparison with the decoded signature.

The foregoing direct viewing device is of substantial length, and a more compact decoding device of shorter length is provided, which also includes a cabinet having a front wall provided with a decoding lens but wherein a plain window is located below the decoding lens. In this device, the check is positioned in the device right-side up so that the encoded signature confronts the plain side of the decoding lens and the hand written signature confronts the plain window below it. A pressure plate is mounted upon the front wall by a spring hinge and holds the check in contact with the decoding lens and the plain window. The cabinet contains electric lamps for direct lighting of the encoded and hand written signatures, and two optical paths, each including a system of mirrors and relay lens system, which ultimately project the decoded signature and the hand written signature onto a viewing screen of frosted glass. The decoding lens decodes the image and inverts the signature, and the lens system in its optical path magnifies it to approximately its original size. The optical system associated with the plain window merely relays the hand written signature without increasing or decreasing its size. In this manner, the decoded signature and the hand written signature are simultaneously projected onto a frosted glass screen, one above the other, for ready visual comparison.

Accordingly, the principal object of the invention is to provide a method and means for encoding data and retrieving the encoded data.

Another object is to provide a simple method and means for encoding and recording data, and for decoding and viewing the decoded data.

Another object is to provide a method and apparatus for encoding and recording data by utilizing a multiple array, or "fly's eye" lens.

Another object is to provide a method and means for encoding and recording data, and for decoding the encoded data and displaying decoded data for visual viewing and comparison with other matter.

Another object is to provide a method and means for aiding in encoding and printing a signature on a bank check, and to provide decoding apparatus that will enable bank tellers and the like to quickly verify the authenticity of the written signature on the check, without being required to examine the bank's signature card, etc.

A further object is to provide a method and means for encoding signatures from signature cards, and reproducing the encoded signatures upon bank checks, bank deposit books, credit cards, etc., and for decoding and comparison of the decoded signature with a hand written counterpart of the encoded signature.

Still another object is to provide a method and means for encoding a signature and photographing a "scrambled" image of the encoded signature to provide a photographic negative thereof.

Still another object is to provide a method and means for encoding a signature in the form of a "scrambled" image and providing a positive print of the image.

A still further object is to provide a method and means for encoding signatures and for preparing a printing plate for reproducing the encoded signature on various documents, and for decoding and comparison with a hand written signature, thereby eliminating the possibility of fraud and forgery in the case of stolen check blanks, bank deposit books, credit cards, etc.

Still another object is to provide a method and means for decoding encoded signatures with direct viewing of the decoded signature or by projection thereof onto a viewing screen.

A specific object is to provide a method and apparatus for enabling the printing of an encoded signature and other encoded data, along with additional matter, on a check blank.

Still another specific object is to provide a bank check having the customer's signature encoded thereon, in a manner that it can be readily decoded and instantly compared with the hand written signature on the check.

A further specific object is to provide a check having an encoded signature and/or other information thereon, and means for decoding the signature and displaying the same for viewing along with the hand written signature on the check to detect forgery.

Other objects and advantages of the invention will be apparent from the following description taken in connection with the accompanying drawings.

DESCRIPTION OF THE DRAWINGS

FIG. 1 is a perspective view of one embodiment of a data encoding and recording device constructed in accordance with the principles of the present invention.

FIG. 2 is an enlarged vertical sectional view, taken on the line 2—2 of FIG. 1.

FIG. 3 is a horizontal sectional view, taken along the line 3—3 of FIG. 2, just above the encoding lens.

FIG. 4 is an enlarged fragmentary sectional view through a portion of the encoding lens, taken on the line 4—4 of FIG. 3.

FIG. 5 is an inverted plan view of the portion of the encoding lens shown in FIG. 4.

FIG. 6 is an enlarged horizontal sectional view, taken on the line 6—6 of FIG. 2.

FIG. 7 is an enlarged fragmentary vertical sectional view, taken on the line 7—7 of FIG. 6.

FIG. 8 is a fragmentary vertical sectional view, taken on the line 8—8 of FIG. 7.

FIG. 9 is an enlarged inverted view of an encoded signature.

FIG. 10 is a plan view of a bank check having the encoded signature shown in FIG. 9 printed thereon.

FIG. 11 is a fragmentary view of the right hand portion of the check shown in FIG. 10, illustrating the encoded signature decoded and enlarged for comparison with the hand written signature on the check.

FIG. 12 is a diagrammatic view of a photocopier having an encoding lens for making a direct positive print of the data to be encoded.

FIG. 13 is a perspective view of another embodiment of an encoding and recording device, wherein the document containing the data to be encoded is mounted in a removable holder that can be bodily inserted into an opening in the front wall of the cabinet.

FIG. 14 is an enlarged horizontal sectional view, taken on the line 14—14 of FIG. 13, and showing a signature card in the holder with the signature centered with respect to intersecting sighting lines inscribed on the holder.

FIG. 15 is an enlarged fragmentary vertical sectional view through the holder, taken on the line 15—15 of FIG. 14, but additionally showing the encoding leans and the lamps for direct lighting or back-lighting the data to be encoded.

FIG. 16 is a perspective view of the holder showing a different signature card centered therein.

FIG. 17 is an enlarged fragmentary vertical sectional view, taken on the line 17—17 of FIG. 14, illustrating the trackway provided within the cabinet for slidably supporting the holder.

FIG. 19 is a plan view of a partially printed check blank that can be used as a paste-up sheet.

FIG. 20 is a view of the check blank of FIG. 19, but showing strips of paper containing the encoded signature and additional matter to be printed, pasted on the check blank.

FIG. 21 illustrates a masking sheet applied over a photographic negative of the paste-up sheet of FIG. 20.

FIG. 22 is a plan view of an offset printing plate resulting from "burning" of the masking sheet and negative shown in FIG. 21.

FIG. 23 is a plan view of one embodiment of a decoding and direct viewing device designed to present the decoded signature for visual comparison with the hand written signature on the check.

FIG. 24 is an enlarged vertical sectional view taken on the line 24—24 of FIG. 23, through the decoding lens and a plain window therebelow, and showing the arrangement of the magnifying and telescopic non-inverting lenses for direct visual comparison of the decoded signature with the hand written signature.

FIG. 25 is a vertical sectional view, taken on the line 25—25 of FIG. 24, particularly illustrating the retractable pressure plate for holding the check in contact with the decoding lens and the plain window.

FIG. 26 is a fragmentary front elevational view of an embodiment of a decoding and display device, with the left hand portion of a check shown extending beyond the side of the device.

FIG. 27 is a plan view of the decoding device shown in FIG. 26, and particularly illustrating a viewng screen having the decoded signature and the written signature on the check both projected thereon for viewing and visual comparison.

FIG. 28 is an enlarged vertical sectional view, taken on the line 28—28 of FIG. 27, particularly illustrating the lenses and mirrors in the optical paths of the encoded and hand-written signatures, respectively, for projecting the same onto the viewing screen of FIG. 27.

DESCRIPTION OF THE PREFERRED EMBODIMENTS

Figure 18:
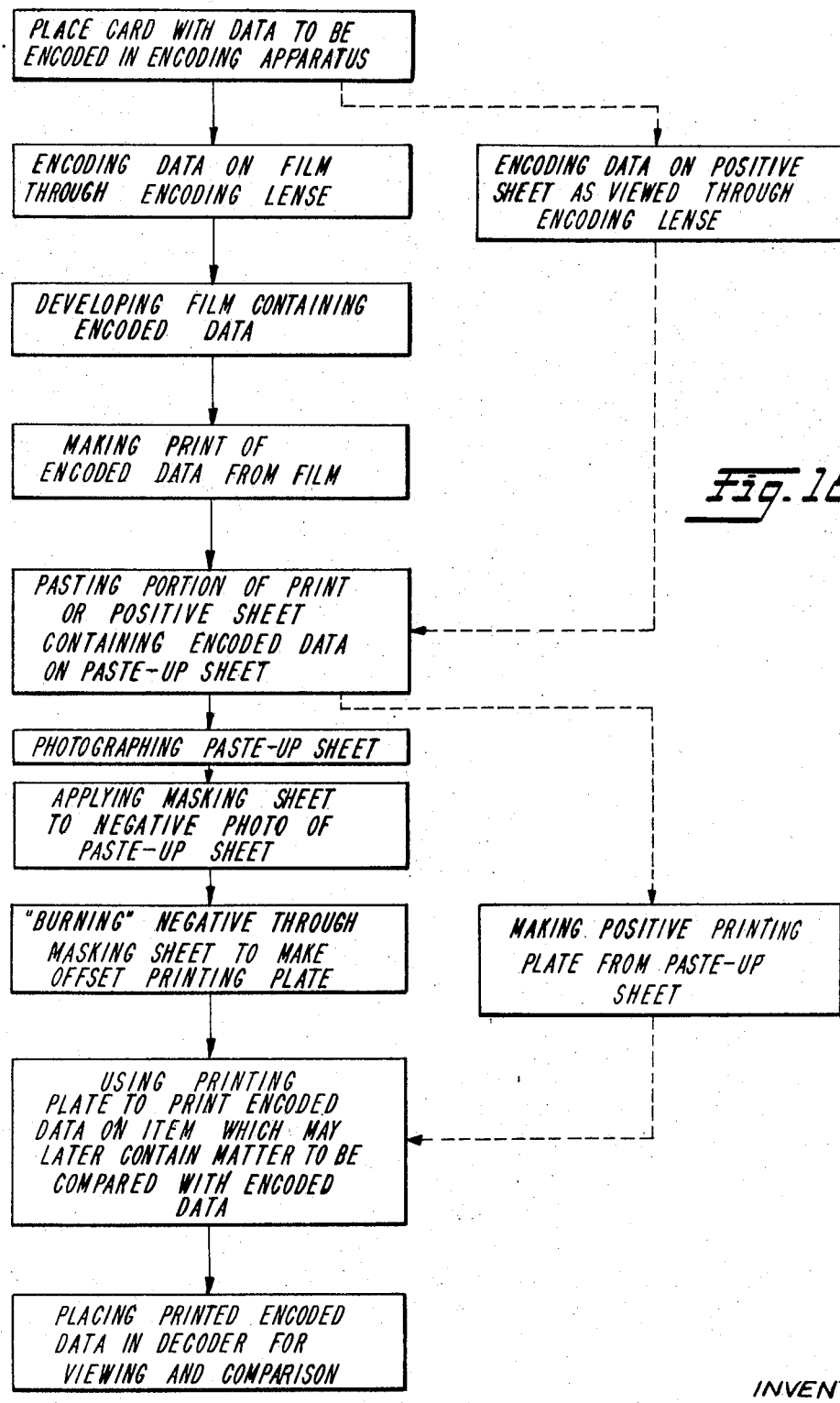
FIG. 18 is a block diagram showing the various steps involved in encoding, recording, decoding and displaying decoded data according to the methods disclosed herein.
Figure 30:
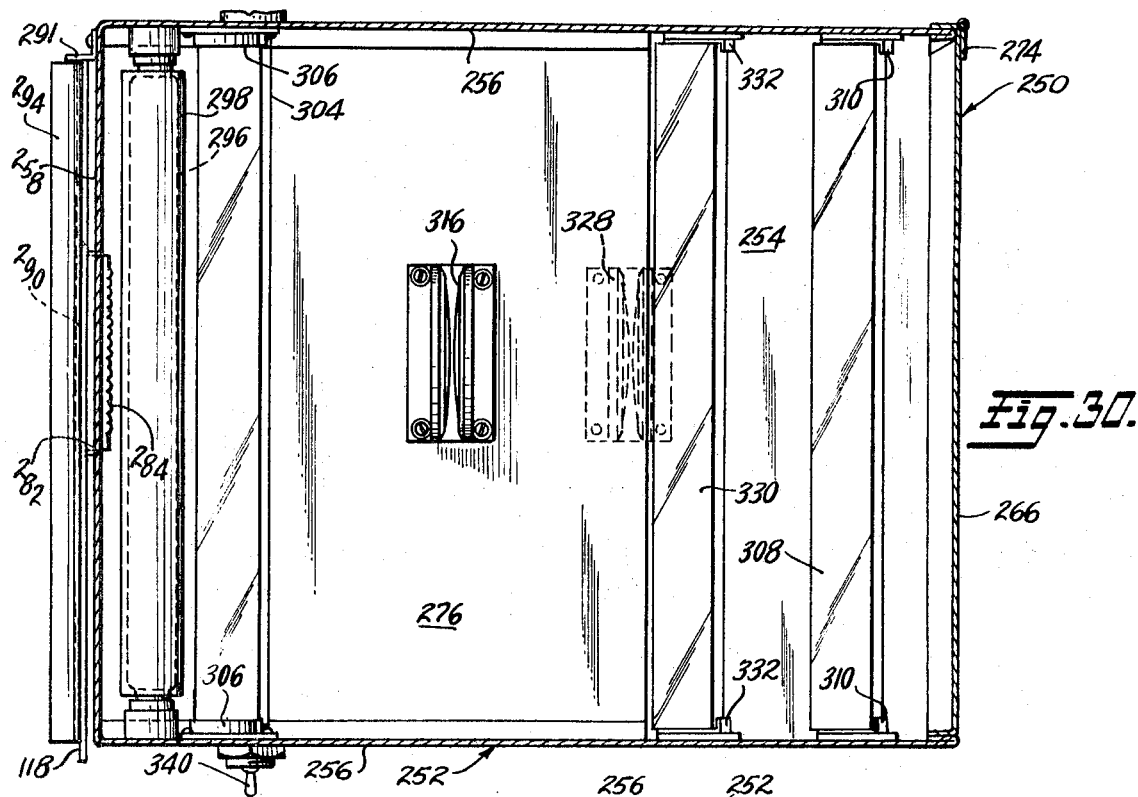
FIG. 30 is a similar view, taken on the line 30—30 of FIG. 28, showing a portion of the mirrors and lenses for enlarging the encoded signature and projecting the same onto the viewing screen.
Figure 29:
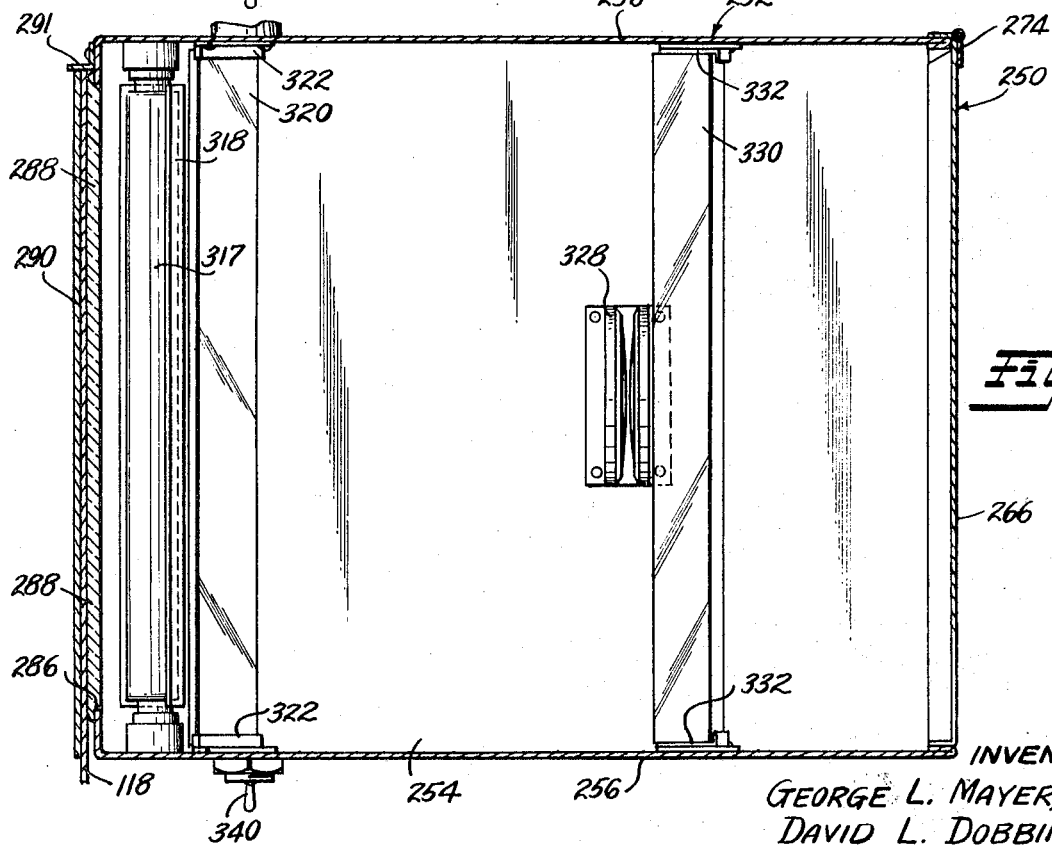
FIG. 29 is an enlarged horizontal sectional view, taken on the line 29—29 of FIG. 28, showing two of the mirrors and the lens system for projecting the hand-written signature onto the viewing screen.

Referring to FIGS. 1 to 8, one embodiment of an encoding device is shown comprising a cabinet 2 having a front wall 4, a side wall 6, a bottom wall 8, a top wall 10, and a rear door 12. The door 12 affords ready access to the interior of the cabinet 2 and has longitudinal flanges 14 that overlap the rear edges of the side walls 6. A pin 16 at the lower end of the door 12 extends through the flanges 14 and the side walls 6 and serves as a hinge. The flanges 14 engage the side walls 6 with sufficient frictional pressure to retain the door 12 in closed position. It will be understood that the cabinet 2 can be made from any suitable material and assembled in any desired manner.

A camera case 18 rests upon the top wall 10 and is detachably mounted thereon and held in place by spring clips 20 fastened by rivets 22 to the side walls 6. The camera case 18 contains a roll of negative, high contrast black and white film 24 that can be manipulated in the usual manner, by wind and rewind knobs 26 and 28, respectively. The lower side of the camera case 18 rests upon the top wall 10 and has an opening 30, that is sealed light-tight with said top wall. The opening 30 registers with an opening 32 in the top wall 10 through which a portion of the film 24 can be exposed to light, as will be explained hereinafter. A rigid structure 34, resembling an extended bellows in shape, has inturned flanges 36 at its upper end secured to the top wall 10, and its lower end carries a conventional shutter mechanism 38 and a transfer lens system 40. The shutter mechanism 38 is operated by a cable 42 connected with a button 44 mounted on one of the side walls 6 of the cabinet 2.

An opaque partition 46 is mounted within the cabinet 2 upon angle members 48 fixed to the side walls 6. The opacity of the partition 46 prevents unwanted light from passing into the space thereabove. The partition 46 has a centrally located, square, opening 50, and a shoulder 52 projects into the opening at its lower edge. A square, plastic, encoding lens 54 is mounted in the opening 50. The encoding lens 54 has a plain marginal portion 56 that is seated upon the shoulder 52 and may be held in place by clamps 68 mounted on the partition 46, or secured to the shoulder 52 by adhesive.

The encoding lens 54 is of a type known as a "fly's eye" lens and comprises a concentrated array of miniature lenslettes 60. One such lens suitable for present purposes is identified as Series MRP–110, and is manufactured by Photo Optical Sciences, Division of Aeroflex Laboratories, Inc., South Service Road, Plainview, Long Island, New York, N.Y. The lens 54 is diagrammatically shown herein and no attempt has been made to draw it to scale because of the small size of the individual lenslettes 60.

By way of specific example and not limitation, the dimensions of the format of the lens array is 2¼ inches by 2¼ inches, plus the plain marginal border 56, which is ¼ inch wide. The front side of the encoding lens 54 contains 2809 identical miniature convex lenslettes 60 (see FIGS. 4 and 5). Each miniature lenslette 60 has a uniform base size of .043 inch by .043 inch, with less than 0.0003 inch separating one from another. The maximum thickness of the encoding lens 54 including the array is 0.204 inch. The lens array optically picks up and retains information viewable as substantially discrete, non-overlapping images at the back or upper side 61 of the lens 54, which is smooth or plain. Each of the lenslettes 60 takes on the characteristic of a full detailed information bit and becomes an individual image storehouse. Thus, by the use of such lens, information can be encoded and recorded, and later retrieved by decoding and displayed for visual viewing, as will appear hereinafter.

Angle shaped members 62 are connected to opposite side walls 6 of the cabinet 2 and support a transparent, non-glare plate of glass, or plastic, 64, which serves as a support for a document 66 containing data 68 to be encoded. In the interest of simplicity and in keeping with the stated example of describing the invention in connection with encoding of a signature on a bank check, the term "signature card 66" will be used with the understanding that it includes any type or form of document containing matter to be encoded. Thus, as is shown in FIG. 7, the data 68 to be encoded consists of the signature "Geo. L. Mayer, Jr." on the signature card 66.

A transparent glass, or plastic, retainer sheet 70 overlies the supporting plate 64 and is secured to the top edge of each of the angle members 62. Pins 72 are mounted in each of the angle members 62 and extend into guide holes 74 in the support plate 64. Low strength compression springs 76 surround the pins 72 and gently urge the support plate 64 upwardly toward the retainer sheet 70 so that the signature card 66 is always retained in a flat condition, and in a predetermined plane confronting the encoding lens 54.

The opaque partition 46 and the support plate 64 form a chamber 78 therebetween containing 2 fluorescent or tungsten electric lamps 80 for producing a uniform illumination of the signature card 66. A reflector 82 is positioned behind each of the lamps 80, the lamps and reflectors being carried by brackets 84 secured to the side walls 6 of the cabinet 2. Similar lamps 86, reflectors 88 and brackets 90 are mounted in a chamber 92 below the support plate 64 and provide a light source for back-lighting the signature card 66 in instances where it is translucent, or thin enough to make back-lighting impossible. The lamps 80 and 86 are controlled by a two-way toggle switch 94 mounted upon one of the cabinet walls 6. Electric current is supplied to the switch 94 by a cord 96, and electrical current from the switch 94 is supplied to the lamps 80 and 86 through wiring 98 and 100, as will be readily understood. The cabinet 2 may have imprinted thereon, legends such as "DIRECT," positioned above the switch 94 so that when the switch lever is moved upwardly, lamps 80 will be illuminated to provide direct lighting on the signature card 66, and "BACK LIGHTING," positioned below the switch 94, so that when the switch lever is moved downwardly, the lights 86 will be illuminated to back-light the signature card 66.

The bottom wall 8 of the cabinet 2 has a number of vent openings 102 formed therein, and the door 12 is provided with louvers 104 in the region of the chambers 78 and 92. The purpose of the vent openings 102 and the louvers 104 is to ventilate the chambers 78 and 92 to allow the escape therefrom of air that has been heated by the lamps 80 or 86. Pads 106 are secured to the bottom wall 8 adjacent each of the corners thereof to space the same from a supporting surface and permit free flow of air into the openings 102.

Referring to FIGS. 1 and 8, the front wall 4 of the cabinet 2 has an elongated slot 108 extending thereacross in a plane generally coinciding with the upper surface of the support plate 64 (FIG. 8). The slot 108 permits air flow into or out of the chamber 78, but its primary purpose is to enable the signature card 66 to be inserted into and withdrawn from the cabinet 2. A stop strip 110 is secured at its ends to the angle members 62, and has a vertical flange 112 that extends along and above the inner edge of the retainer sheet 70. In order to facilitate insertion of the signature card 66 in proper position on the support plate 64, the forward edge of said plate is rounded as indicated at 114, and the forward edge 115 of the retainer sheet 70 is curved upwardly so that as the signature card 66 is inserted, it is automatically directed into a plane between the support plate 64 and the retaining sheet 70. The apparatus is designed so that the bottom edge of the signature card 66 projects outwardly of the cabinet 2 when its inner edge is engaged with the stop flange 112. This makes it convenient to insert and withdraw the signature card 66.

In FIG. 6, the signature 48 is located on the signature card 66 in a prescribed area such that the mid point of the length of the signature substantially coincides with the focal axis of the encoding lens 54, as indicated by the intersecting dot-and-dash lines X and Y. However, it is to be understood that some leeway exists with respect to the location of the signature 68 on the signature card 66, inasmuch as each of the miniature lenses 60 in the array, in effect, photographs only that portion of the signature which it "sees." It will be understood that the same is true of all of the remaining miniature lenses 60 in the array, so that the ultimte image of the full signature appearing on the back 61 of the encoding lens 54 consists of a multiplicity of images, no two of which are exactly alike. In this manner, the signature 68 is "scrambled" to an unrecognizable conglomoration of non- overlapping images, as illustrated at 116 in FIG. 9, which represents the encoded signature 68 appearing on the signature card 66, as "seen" by the encoding lens 54, but in inverted form.

As is illustrated in FIG. 2, the distance A between the back face 61 of the encoding lens 54 and the transfer lens system 40 is equal to the distance B between the film 24 in the camera case 18 and the relay lens 40 (each distance being twice the focal length of the relay lens 40), so that upon exposure of the film, an image of the same size as that appearing at the upper face 61 of the encoding lens 54 is recorded on the film 24. On the other end, the distance C between the signature card 66 and the back 61 of the encoding lens 54 may be varied to provide a desired reduction in the encoded size of the signature 68 appearing on the signature card 68. In the case of the encoding of signatures from bank signature cards, the distance C is preferably such that the size of the encoded signature 116 is reduced by about ½, so that upon reproduction and printing of the encoded signature on a check 118, FIG. 10, it will not take up too much space. However, it will be understood that the reduction may be less or greater than ½, or that the encoding lens 54 may be positioned so that no reduction in size occurs.

By way of example, and not limitation, in the apparatus shown in FIG. 2, the transfer lens 40 has a focal length of 6". The distance A from the film 24 to the center of the transfer lens 40 is twice the focal length, or 12"; and the distance B from the center of the transfer lens 40 to the back 61 of the encoding lens 54 is equal to A, or 12". The distance C from the back 61 of the encoding lens 54 to the top of the signature card 66 is ⅞". These dimensions are selected to provide about a ½ reduction in the size of the encoded signature 116 relative to the original size of the signature, and to provide a 1 to 1 ratio of the image appearing on the back 61 of the encoding lens 54 and photographed on the film 24. The portion of the film on which the signature is photographed may be 1" by 2" for present purposes.

In FIG. 10, the encoded signature 116 is shown printed upon a bank check 118 adjacent to the check "No.," and located vertically above the area where the written signature of the drawer appears. This location for the encoded signature is preferred, since it conveniently arranges the encoded, printed signature relative to the handwritten signature in such relation to each other that they can be simultaneously viewed and compared through a decoder device, as will be explained more fully hereinafter.

Another embodiment of an encoding device is illustrated in FIGS. 13 to 16, inclusive, wherein corresponding parts identical to those described above are identified by the same numerals. In this embodiment, the cabinet structure 2a is substantially similar to that previously described, except that the retaining sheet 70 and the document support plate 64 are replaced by a transparent holder, generally identified by the numeral 120. The holder comprises a transparent base sheet 112 having a transparent cover 124 mounted thereon by a flexible plastic hinge 126 adhesively secured to the rear edge 128 of the base 112 and to the rear edge portion 130 of the cover 124.

The base 112 has cross lines Xa and Ya thereon, which interesect at a point coinciding with the focal axis of the encoding lens 54. This arrangement enables a data card which may be in the form of a signature card 66a and having a signature 68a located in a different area from that shown in FIG. 6 to be positioned upon the transparent base 112 so that the center coincides substantially with the point of intersection of lines Xa and Ya. The cover 124 serves to retain the signature card 66a in place while the holder 122 is being inserted into the cabinet 2a through an elongated opening 108a formed in the front wall 4 of the cabinet. An angle-shaped piece of plastic 132 has one of its legs 134 adhesively secured to the forward edge of the cover 124, and has a knob 136 cemented to its other leg 138 at the midpoint thereof. The knob 136 serves two purposes: (1) to raise and lower the cover 124 and (2) to enable the holder 120 to be readily inserted and withdrawn through the slot 108a.

The holder 120 is slidably supported within the cabinet 2a by an angle member 140, FIGS. 14 and 17, fixed to each of the sides 6 of the cabinet, and a generally Z-shaped member 142 secured to each of the angle members 140. The flanges 144 and 146 of the Z-shaped member 140 cooperate with a horizontal flange 148 of the anglemember 140 to form a trackway for the holder 120. The holder 120 may be of such size that it can be pushed all the way into a cabinet 2a so that the rear wall or door 12 of the cabinet serves as a stop. As will be seen from FIG. 15, the transparent base 122 and cover 124 assume a position between the lights 80 and 86. This figure also illustrates the relationship between the holder 120 and the opaque partition 46 supporting the encoding lens 54. Thus, the encoding device shown in FIGS. 13 to 17 may have the data card 68a carried by the holder 120 either directly illuminated or back-lighted, as in the device shown in FIGS. 1 to 8.

FIG. 14 shows the holder 120 disposed within the cabinet 2a, but with another form of signature card 68b having a signature to be encoded located in the upper left hand portion thereof. Thus, a comparison of FIGS. 14 and 16 will illustrate the versatility of the holder 120 for receiving signature cards, having signatures thereon located in different areas of the card, but which, nevertheless, through the provision of the cross lines Xa and Ya can be accurately located in the holder 120 before the holder is inserted into the cabinet 2a, so that the center of the signature will be aligned with the focal axis of the encoding lens 54. Such pre-positioning of the data card in the holder 120 assures proper location of the data card with respect to the encoding lens 54.

The negative of the encoded signature obtained with the modified encoding device of FIGS. 13 to 17 is developed and printed in the same manner previously described in connection with FIGS. 1 to 8, so that the encoded signature 116 is ultimately printed on a check 118 in the location previously described.

In photographing the image appearing at the back face 61 of the encoding lens 54, the camera 18 is operated in the usual manner by depressing the button 44, which operates the shutter 38 adjacent the transfer lens 40. Thus, the encoding device can be operated to successfully photograph any number of signature cards 66, depending upon the length of the film 24. After exposure, the film 24 is developed and a positive print is then made therefrom. The manner in which the positive print of the encoded signature is used in making an offset printing plate will be described later.

In lieu of using the negative film method described hereinabove for recording the image of an encoded signature, the signature card holder 120 and the encoding lens 54 can be associated with a photocopier 150, as diagrammatically shown in FIG. 12, so that a positive photo of the encoded signature is directly obtained. This method has the advantage of eliminating certain steps in the process employed with the negative film method, as has been previously indicated. See also the block diagram of FIG. 18 which is a block diagram containing legends setting forth the sequential steps of the methods of encoding and decoding data described herein.

A pair of lamps 80a below the holder 120 will directly light the data to be encoded, and lamps 86a above the holder can be used for back lighting, the lamps being selectively controlled by a switch 94a, in the same manner previously described. The photocopier 150 is controlled by an OPERATE button 152. The direct positive print is used in the same manner as the print obtained from printing the film 24, as will presently be explained.

Figures 19, 20:
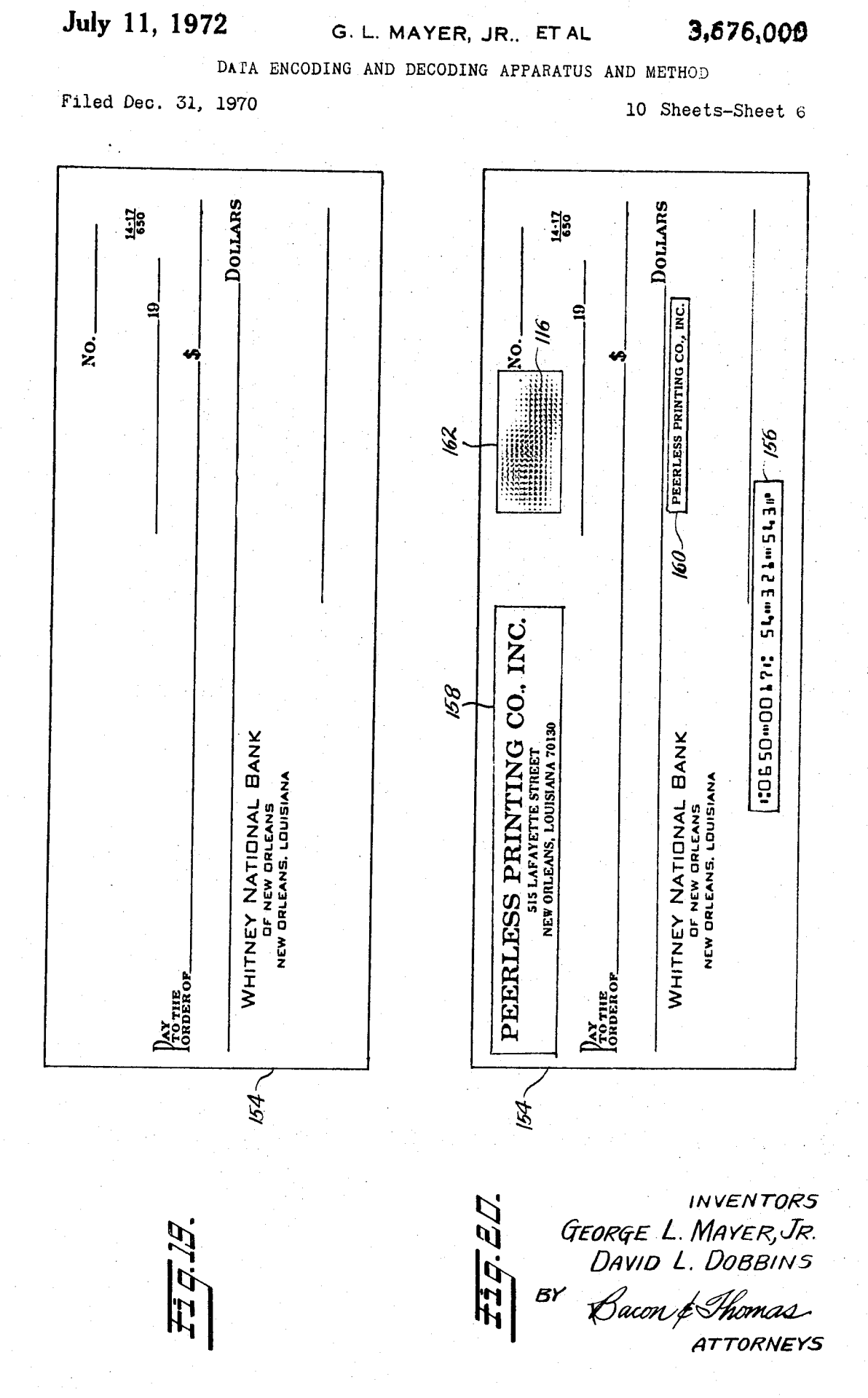

FIG. 19 illustrates a master or paste-up sheet 154, which may be in the form of a partially printed bank check. As is shown, the sheet 154 has had previously printed thereon the name of the bank, the local bank code, and lines indicating the place where the date, the check No., the name of the payee, the amount of the check and the signature of the drawer should be filled in. Such pre-printed matter need not appear on the paste-up sheet but in any event it would appear on the paper used to print the check. The use of a partially printed bank check as a paste-up sheet makes it easier to correctly index additional matter that is to be printed on the check paper. Present banking regulations require that each check also include printed numerals and certain symbols to enable handling of the checks by a computer. Each customer, of course, has a different identifying account number. Therefore, this account number is pre-printed or typed on a strip of paper 156 and pasted on the master sheet 154 below the name of the bank (FIG. 20). It is also quite common to print the name and address of the customer on the blank check, wherefore, a strip of paper 158 containing such name and address is shown pasted in the upper left hand corner of the master sheet 154. The name of the customer can also be pre-printed on a strip of paper 160 and pasted in place above the signature line.

It will be seen that after the foregoing information has been applied to the master sheet, ample space remains for printing various encoded matter, including the encoded signature 116 of a customer, credit information, etc. Therefore, it is a matter of choice as to the available space on the blank check that will be used for imprinting the encoded signature and other data. From a practical standpoint, a very convenient place to locate the encoded signature is along the upper portion of the check adjacent to the check No. Accordingly, a photoprint 162 of the encoded signature 116, obtained by any of the several methods described hereinbefore, is pasted on the master sheet 154 in the area indicated. The master sheet 154 as thus composed, is then photographed in its entirety to provide a negative 164 (FIG. 21) that is used in producing an offset printing plate, as will now be described.

An opaque masking sheet 166, FIG. 21, has openings 168, 170, 172 and 174 cut therein in identically the same relative areas occupied by the strips 156, 158, 160 and 162, respectively, that were pasted on the master sheet, 154. The photographic negative 164 is attached to the underside of the masking sheet 166 by small pieces of Scotch tape 176, or the like, so that the openings 168, 170, 172, and 174 in the masking sheet 166 will overlie those portions of the negative corresponding to the strips 156, 158, 160 and 162 that were applied to the master sheet 154. It will be noted that the masking sheet 166 blocks out all of the original matter that was printed on the master paste-up sheet 154 shown in FIG. 19. The reason for this is that such matter is pre-printed on the check blanks that are to be completed for a particular customer. Accordingly, the only matter to be added thereto to complete the checks is that which was applied in the way of strips 156, 158, 160 and 162 to the paste-up sheet 154.

The masking sheet 166 with the negative 164 attached are placed over a photo-sensitized plate 178 with the negative 164 in contact with the plate. This assembly is exposed to suitable light, or "burned," whereupon only those portions of the negative that are in registration with the openings 168, 170, 172 and 174 in the masking sheet 166 will be effected. Upon developing the sensitized plate, an offset printing plate 178, FIG. 22, is formed, which contains only the matter that was printed on the strips 156, 158, 160 and 162 applied to the paste-up sheet 154, the matter on the offset printing plate 178 being located in identically the same areas as said strips. To facilitate correlation, the negative 164 has been shown in dot-and-dash lines. Therefore, when the offset printing plate 178 is used to print the additional matter on partially printed check blanks, the completed checks will have the appearance of the check 118 shown in FIG. 10, without, of course, the written signature.

It will be understood from the block diagram of FIG. 18, and the description of the photocopier 150 shown in FIG. 12, that a positive print of the encoded negative 116 can be directly made, thereby eliminating the steps of encoding the signature on the film 24, developing the film, and making a positive print from the film. A direct positive print of the encoded signature can be used as the strip 162 on the paste-up sheet 154.

It will also be understood from the block diagram of FIG. 18, that the alternative method of making a positive printing plate directly from the paste-up sheet 154 will eliminate the steps of photographing the paste-up sheet 154, applying a masking sheet 166 to the negative and "burning" the negative through the masking sheet to provide the offset printing plate 178. The positive printing plate (not shown) will resemble the offset printing plate 178 and can be used to complete a partially printed check in the same manner described in connection with the use of the offset printing plate 178.

The check 118, FIG. 10, after it has been filled out by the authorized drawer and a hand written signature 180 applied thereto, can be presented by the payee to the bank for cashing or deposit. The check 118 can then be placed in a decoding device, described hereinafter, for comparison of a decoded image 116a, FIG. 11, of the encoded printed signature with the hand written signature 180.

Actually, two types of decoding devices are disclosed herein; one type providing direct viewing of the decoded data and the other providing a projected image of the decoded data. These will be described in the order named.

FIGS. 23, 24 and 25 illustrate a direct viewing type of decoder 182, wherein the decoded signature 116a is magnified to twice its size, and the hand written signature 180 is directly viewed full size. The decoder 182 is mounted upon a desk stand (not shown) so that it is convenient to eye level. The decoder 182 comprises a cabinet, or housing, 184 having side walls 186 and 188, which diverge forwardly from a cylindrical portion 190 serving as a non-inverting eye-piece such as a monocular, and a mounting for a telescopic lens system 192. A top wall 194 and a bottom wall 196 of the housing 184 also diverge forwardly from the cylindrical portion 190. The end of the housing 184 is greater in width than the length of the check 118, and is closed by a front wall 198 having a decoding lens 200 mounted in an opening 201 in axial alignment with the lens system 192. The decoding lens 200 is adhesively secured in the opening 201. This lens is identical to the encoding lens 54. The front wall 198 also has a plain glass or transparent plastic window 202 mounted therein below the decoding lens 200. It will be noted that the plain side of the decoding lens 200 and the outer face of the window 202 lie in the same vertical plane. A magnifying lens 204, which may be of the oblong type or other type, is mounted in the housing 184 inwardly of, but close to, the decoding lens 200. The design of the lens 204 is such that it magnifies the image on the array-side of the decoding lens 200 to twice its size for direct viewing through the non-inverting eyepiece lens system 192.

The front end of the housing 184 mounts a box-like section 206 that is connected at its lower side with the housing bottom wall 196 by a piano type hinge 208. The hinged structure 206 is maintained in a closed position by latches 209 at each end thereof. A pair of electric lamps 210 and reflectors 212 is mounted in the box-like structure 206, one in front of the decoding lens 200 and the other in front of the window 202. These lamps are controlled by a switch 211 connected thereto by wiring (not shown), electrical current being supplied by a cord 214.

A portion of the upper edge of the box-like structure 206, adjacent the housing top wall 194 is bent inwardly, as indicated at 216 to provide a space to receive the check 118. Insertion of the check 118 is facilitated by the front wall 198 and a guide 218 and 220 mounted upon the box-like structure 200 adjacent the inwardly bent portion 216.

In order to assure that the check 118 will be held in contact with the decoding lens 200 and the window 202, a pressure plate 222 is slidably mounted within the box-like structure 206. Six blocks 224 are secured in place in the interior of the box-like srtucture 206, two at each end thereof and two in the middle. Six pins 226, each having one end thereof welded to the pressure plate 222 are received in holes 228 in the blocks 224. Each of the holes 228 is countersunk to receive one end of a spring 230 disposed between the pressure plate 222 and the blocks 224. An opening 232 in the pressure plate 222 is aligned with the decoding lens 200, and a similar opening 234 in said plate is aligned with the window 202. Light from the lamps 210 passes through the openings 232 and 234 to back light the portions of the check 118 containing the encoded signature 116 and the hand written signature 180.

An operating rod 236 for the pressure plate 222 is pivotally mounted in the box-like structure 206 and has ends which project beyond the side wall thereof, and upon which operating levers 218 are mounted. Angle brackets 240 are soldered in spaced relation to the longitudinal control portions of the pressure plate 222, and yokes 241 are fixed to the rod 236 and carry a downward projection 242 that extends into an opening 244 in a horizontal leg of each of the brackets 240. Accordingly, when either of the levers 238 is turned clockwise as viewed in FIG. 24, the pressure plate 222 will be retracted within the box-like structure 206 and allow insertion of the check 118 in confronting optically indexed relation to the decoding lens 200 and the window 202. Optical indexing of the encoded signature 116 with the decoding lens 200 is essential for obtaining a clear image of the decoded signature.

The decoding lens 200 and the magnifying lens 204 are located in the right-hand portion of the housing 184 to coincide with the location of the encoded structure 116 and the hand written signature 180 on the check 118. Assuming that the lamps are turned on, the encoded signature 116 and the hand written signature 180 will both be back-lighted through the openings 232 and 234 in the pressure plate 222, so that they can be simultaneously viewed by looking through the lenses 192 in the non-inverting eye-piece. After a comparison of the two signatures has been made, one of the levers 238 is again moved clockwise and the check 118 is then removed from viewing position. The presence of the levers 238 at opposite ends of the rod 236 adapt the device for ready use by either right or left-handed persons. A recess 199 is formed in the front wall 198 in the region between the guides 218 and 220 to permit the check 118 to be grasped for easy removal and insertion.

Another embodiment of a decoding device is shown in FIGS. 26 to 30, inclusive. The decoder is generally identified by the numeral 250 and comprises a cabinet or housing 252 having a bottom wall 254, side walls 256, a front wall 258, a top wall comprising portions 260 and 262 with a portion 264 therebetween inclined on an angle of 45° and a door 266 forming a rear wall. The inclined top wall portion 264 has a flanged opening 268 for receiving and supporting a frosted glass viewing screen 270. The screen 270 is held in place by metal clips 272. The door 266 is mounted upon a piano type hinge 274 and is held closed by a knob latch 275.

A partition 276 is horizontally mounted within the housing 252 and divides the same into an upper chamber 278 and a lower chamber 280. The front wall 258 has an opening 282 located above the partition 276 and spaced a predetermined distance from one of the side walls 256. The opening 282 has a decoding lens 284 adhesively mounted therein, which is identical to the encoding lens 54. The front wall 258 also has an opening 286 below the partition 276 in which a plain transparent window 288 is mounted, with the outer surface of the window 288 in the same vertical plane as the plain surface of the decoding lens 284.

A pressure plate 290 is mounted at its lower edge on a spring hinge 292 secured to the front wall 258 along a line directly below the window 288. The purpose of the pressure plate 290 is to hold the check 118 in contact with the decoding lens 284 and the window 288, it being understood that the check 118 has been shown in exaggerated thickness for purposes of illustration. It is to be further noted that, in this embodiment, the check 118 is placed in the decoder 250 in an upright position, that is to say, with the encoded signature 116 uppermost so that it will confront and be optically indexed with the decoding lens 284. In this connection, a stop strip 291 is mounted on the front wall 258 and located along the left edge of the pressure plate 290 to form an abutment or guide for properly indexing the check 118 in the decoder 250. The plate 290 has a ledge portion 294 at its upper edge that can be grasped by the fingers to pull the upper end of the pressure plate 290 away from the housing 252 to facilitate insertion and removal of the check 118. The decoder 250 is shorter in width than the length of check 118, wherefore, the left hand end of the check extends beyond the right side of the housing 252, as is best shown in FIGS. 26 and 27.

The housing 252 contains different optical systems comprising lenses and mirrors respectively associated with the decoding lens 284 and the window 288. The check 118 is placed in the decoder 252 rightside up so that the encoded data thereon confronts the decoding lens 284 and the written signature 180 confronts the window 288.

An electric lamp 296 and a reflector 298 are mounted adjacent the decoding lens 284 and above the focal axis thereof. The check 118 is positioned so that the center of the encoded signture 116 coincides with the center of the decoding lens 284, as in encoding, the decoding lens 284 will invert the decoded signature and cause it to appear rightside up at the array-side of the lens; wherefrom, it is reflected horizontally rearwardly upon a mirror 300, mounted upon brackets 302, which are secured to the side walls 256. The mirror 300 is mounted upon an angle of about 45° and faces a similar parallel mirror 304 mounted upon brackets 306, upon which it vertically reflects the image from the decoding lens 284. A third mirror 308 is mounted upon brackets 310 and faces the mirror 304 on an angle of about 45°, and a fourth mirror 312 is mounted upon brackets 314 and is arranged on an angle of about 22½° from the vertical and faces the viewing screen 270. A lens system 316 is mounted on the partition 276 in the chamber 278 at a predetermined point between the mirrors 304 and 308. The lens system 316 is designed so that the image as reflected horizontally from the mirror 304 is magnified to about twice its size. The enlarged image provided by the lens system 316 is transmitted horizontally onto the mirror 308 and then directed upwardly onto the mirror 312, and then onto the upper portion of the viewing screen 270, upon which it is visible, as illustrated in FIG. 27.

An electric lamp 317 and a reflector 318 are mounted in the chamber 280 adjacent to the lower portion of the window 288. The lamp 317 illuminates the hand written signature 180 on the check 118 and its image is reflected horizontally onto a mirror 320 mounted upon brackets 322 disposed on an angle of about 45° to the horizontal. This image is reflected vertically downwardly onto a second mirror 324 mounted upon brackets 326, from which it is reflected horizontally to a lens system 328 mounted on the bottom wall 254. Since the check 118 is positioned in the decoder rightside up, the lens system 328 is designed to relay the signature without altering its size, so that it is transmitted onto a third 45° mirror 330 mounted upon brackets 332. A fourth mirror 334 is mounted at an angle of about 30° to the vertical upon brackets 336 and receives the reflected signature from the mirror 334 and projects it onto the lower portion of the viewing screen 270, upon which it is visible, as illustrated in FIG. 27.

FIG. 27 is a plan view of the decoder 250 and illustrates the decoded signature 116a and the hand written signature 180 as projected upon the viewing screen 270 for easy comparison by a bank teller, merchant, or other party interested in verifying the signature on the check 118.

Electrical current for the lamps 296 and 317 is supplied by an electric cord 338 connected with an on-off switch 340 mounted on the right hand side wall 256. The switch 340 is connected with the lamps 296 and 317 by wiring, not shown.

In FIG. 28, two optical paths are illustrated by dot-and-dash lines, one for the decoded signature 116a and one for the hand written signature 180. The optical path for the decoded signature 116a includes the decoding lens 284, which inverts the decoded signature, the mirrors 300 and 304, the magnifying lens system 316, and the mirrors 308 and 312. For twice magnification of the decoded signature 116a, and using a lens 316 having a focal length L of 5⅓ inches, then the distance from the lens array on the decoding lens 284 to the center of the magnifying lens system 316 will be 1½L; and the sum of the distances from the lens system 316 to the mirror 308 from mirror 308 to mirror 312, and from the mirror 312 to the viewing screen 270 will be 3L. Numerically, the first distance in one operative example of the decoding device 260 would be 8 inches, and the second distance would be twice as long, or 16 inches.

Considering now the optical path of the hand written signature 180, the distance from the window 288 to the center of the lens system 328, which has a focal length L' of 6 inches, for example, is 2L' or 12 inches, and the sum of the distances from the center of the lens system 328 to the mirror 330, from mirror 330 to mirror 334, and from the mirror 334 to the viewing screen 270 is also equal to 2L'. Thus, the total length of the optical path of the decoded signature 116a is 24 inches and the total length of the optical path of the hand written signature 180 is 24 inches.

In using the decoding device 250, the ledge 294 is grasped and the pressure plate 290 is pivoted in a direction away from the housing 254 and the check 118, in an upright position, and with the printed matter thereon facing the decoder, is positioned behind the plate in confronting relation with the decoding lens 284 and the window 288 with the right hand end engaging the stop 291. With the electric lamps 296 and 317 turned on, the encoded matter is front lighted, decoded and reflected upon the upper portion of the viewing screen 270 in the form of the decoded signature 116a, and the hand written signature 180 is projected onto the viewing screen 270 below the decoded signature, so that comparison for possible forgery can be instantaneously made.

The above described encoding methods permit photographic encoding of a signature for printing on the face of a check, together with other encoded information, if desired. One of the advantages of this is that, within the bank, there is no necessity for an alphabetical or other search to be made for the original signature for comparison with the hand written signature on the check, since the encoded signature on the face of the check then becomes the "control" signature. This makes it possible for each teller, officer, or other employee of the bank to use a decoding device to compare the control signature with the hand written signature, with great convenience and a minimum of wasted time.

The present methods and apparatus also permit comparison of written signatures with the encoded signature in businesses other than banks, and which may not have the drawer's signature on file. Moreover, the disclosed methods, in effect, convert an ordinary bank check into a pre-signed type of check whereon the signature of the person to whom the check has been issued is written at the time of issuance for comparison with the signature added to the check at the time it is presented for cashing, but without the disadvantage of disclosing the written form of the signature to prospective forgers, in case the blank check is lost or stolen.

Likewise, additional encoded information concerning credit, average deposit, etc., can be encoded on the check without the customer having knowledge thereof, but which would be of vital interest to the establishment cashing the check, for example, a hotel, motel, department store, etc., as well as at banks themselves. Credit cards with encoded signatures would also afford a protection to the holder as well as the issuing company, since a signature on a voucher, etc., could be readily compared with the encoded signature on the credit card.

The present method also gives the customer of a bank many benefits because the encoded signature is a safeguard against misuse of the check.

It will be understood that various changes may be made in the methods and in the design, arrangement, proportions, etc., of the encoding and decoding devices disclosed herein, without departing from the principles of the invention or the scope of the annexed claims.

We claim:

1. The method of encoding, recording, and decoding data, comprising the steps of: converting the data to be encoded into an array of a multiplicity of discrete, closely adjacent, non-overlapping images; reproducing said array on a document; and reconverting said images on said document to an image corresponding to said data prior to encoding.

2. The method as defined in claim 1, including the step of: utilizing a fly's eye lens to convert the data to be encoded into the discrete non-overlapping images.

3. The method as defined in claim 2, including the steps of: making a photographic record of the discrete, non-overlapping images; and reproducing said photographic record of said images on the document.

4. The method as defined in claim 3, including the steps of: making the photographic record of the images on a negative; and then making a positive print from the negative.

5. The method as defined in claim 3, including the step of: making the photographic record of the images directly from said images on a positive print.

6. The method as defined in claim 1, including the step of: encoding the data in a size different from its original size.

7. The method as defined in claim 6, wherein the data is encoded in reduced size.

8. The method as defined in claim 7, wherein, in reconverting the encoded images, the reduced size image is enlarged to substantially the same size of the data prior to encoding.

9. The method as defined in claim 1, wherein the reproduction of the images on the document consists in ink-printing said images on the document.

10. The method as defined in claim 1, wherein the data encoded is a signature, and the document is one selected from the group consisting of a bank check, a credit card, a bank passbook, or the like.

11. The method as defined in claim 1, in which the reproduction of the images on the document involves the further steps of: providing a positive photographic print of the encoded images mounting said positive photographic print on a paste-up sheet; making a photographic negative of said paste-up sheet; cutting an opening in an opaque masking sheet in a location such that it will overlie the encoded images on said photographic negative; assembling said masking sheet on said negative so that said opening overlies said encoded images on said photographic negative; positioning the assembly of the negative and masking sheet over a sensitized printing plate and subjecting the same to light to expose said printing plate through said opening; developing said printing plate; and utilizing said printing plate to print the encoded images on said document.

12. The method as defined in claim 11, including pre-printing matter on the paste-up sheet and mounting the positive photographic print on said paste-up sheet in predetermined relation to said pre-printed matter.

13. The method as defined in claim 11, including the steps of: adding additional matter to be printed, along with the encoded images, on the paste-up sheet; and cutting an additional opening in the masking sheet to overlie the matter thus added to the paste-up sheet.

14. The method as defined in claim 1, in which the document on which the encoded images are reproduced, includes space to receive matter to be compared with the reconverted image of the encoded images.

15. The method as defined in claim 1, in which the reproduction of the images on the document involves the further steps of: providing a positive photographic print of the encoded images; mounting said photographic positive print on a paste-up sheet; making a positive printing plate from said paste-up sheet; and utilizing said positive printing plate to print said encoded images on said document.

16. The method of encoding and decoding data, comprising: encoding data by positioning a fly's eye lens over the data to be encoded with the array-side thereof facing said data; photographing the image appearing on the back of the fly's eye lens thus positioned; printing a reproduction of said encoded image on a sheet or the like; and positioning said printed encoded image in contact with the back of a fly's eye lens to reproduce a decoded image of said data on the array-side of said last-mentioned fly's eye lens.

17. The method of encoding and recording data, comprising the steps of: converting the data to be encoded into an array of a multiplicity of discrete, closely adjacent, non-overlapping images; and reproducing said array on a document.

18. The method of encoding and recording data comprising the steps of: converting the data to be encoded into an array of a multiplicity of discrete, closely adjacent, non-overlapping images; and reproducing said array on a document by ink-printing.

19. The method as defied in claim 1, in which the encoded images are of a signature and wherein the document on which the encoded images are reproduced is a check which includes space to receive an original signature to be compared with the reconverted image of the encoded signature.

20. The method as defined in claim 14, in which an original signature appears in the space on the check, and including simultaneously transmitting both the reconverted image of the encoded signature, and an image of the original signature, onto a viewing screen for comparison purposes.

21. The method of comparing an encoded signature with a handwritten signature, comprising: decoding an encoded signature appearing on a document and transmitting an image of the decoded signature to a viewing screen; and simultaneously therewith transmitting an image of a handwritten signature appearing on a document to the same viewing screen for comparison with the image of the decoded signature.

22. The method of encoding and decoding data, comprising: encoding data by positioning the data to be encoded in confronting relation to one side of a fly's eye lens to form an encoded image on the opposite side of said fly's eye lens consisting of a multiplicity of discrete, closely adjacent, non-overlapping images; photographing the encoded image appearing on said opposite side of said fly's eye lens; printing a reproduction of said encoded image on a sheet or the like; and positioning said sheet with the printed encoded image in confronting relation to one side of a fly's eye lens to reproduce a decoded image of said data on the opposite side of said last-mentioned fly's eye lens.

References Cited
UNITED STATES PATENTS

| 3,166,625 | 1/1965 | Brumley | 355—43 X |
| 3,178,993 | 4/1965 | Ferris et al. | 355—40 X |

SAMUEL S. MATTHEWS, Primary Examiner

R. A. WINTERCORN, Assistant Examiner

U.S. Cl. X.R.

95—1, 1.1; 350—167